United States Patent [19]

Stone et al.

[11] Patent Number: 4,955,020
[45] Date of Patent: Sep. 4, 1990

[54] BUS ARCHITECTURE FOR DIGITAL COMMUNICATIONS

[75] Inventors: William H. Stone, Somerdale; William E. Boyer, Marlton, both of N.J.

[73] Assignee: Infotron Systems Corporation, Cherry Hill, N.J.

[21] Appl. No.: 374,086

[22] Filed: Jun. 29, 1989

[51] Int. Cl.⁵ .................... H04L 7/08; H04L 12/40; H04L 29.04

[52] U.S. Cl. .................... 370/85.9; 455/3; 375/36; 375/107; 375/111; 370/100.1; 370/105.4

[58] Field of Search ............ 375/36, 107, 111; 370/85, 85.9, 100.1, 105.4; 455/3; 307/42, 147; 333/24 R, 1, 100; 328/105, 153

[56] References Cited

U.S. PATENT DOCUMENTS 4,370,648 1/1983 Wagner et al. .................... 370/105
4,445,048 4/1984 Graham .................... 375/36

Primary Examiner—Douglas W. Olms
Assistant Examiner—Christopher O. Edwards
Attorney, Agent, or Firm—Howson and Howson

[57] ABSTRACT

In a digital communications system comprising a plurality of modules plugged into slots, the backplane provides a private five-conductor data bus for each module slot so that data from the modules are transmitted over separate busses. Each of the data busses is split into separately driven branches extending to the right and to the left of its corresponding module, so that the drivers are located at the ends of the branches rather than connected to an intermediate point on a bus. Pairs of slots are connected through the backplane so that, instead of having one module in each slot driving a five conductor data bus, the system can alternatively have a double-bandwidth module in every other slot driving a ten-conductor data bus made up of two five-conductor busses. Clock and synchronization signals provided by control modules are conducted to device modules over separate conductors on the backplane. The synchronization signals are encoded to represent the time within each message frame, thereby permitting synchronization within a time as short as twenty microseconds in a two millisecond frame. Reset signals for the individual modules are appended to the synchronization signals. Coordinated switch-over between two redundant control modules is effected by three voting lines controlled respectively by each control module and by all of the device modules ORed together.

31 Claims, 8 Drawing Sheets

BUS ARCHITECTURE FOR DIGITAL COMMUNICATIONS

BRIEF SUMMARY OF THE INVENTION

This invention relates to digital communications and in particular to a novel bus architecture for interconnecting plug-in modules in a digital communications system.

A typical digital communications system comprises a plurality of high bandwidth, multiplexed telecommunications devices interconnected by a switching apparatus capable of connecting each channel of any one of the interconnected devices to any selected channel of any other one of the devices. The devices may be, for example, telecommunications processors, image transmission equipment, local area networks (LANs) or voice private branch exchanges (PBXs). The switching apparatus ordinarily comprises a group of interconnected modules, there being one module for each link or group of links of the interconnected networks. These modules typically take the form of plug-in modules which are adapted to fit into multiple-contact slots on a circuit board or group of overlying circuit boards known as a "backplane". Multiple-conductor busses on the backplane are connected in common to all of the slots and serve to transmit digital information from each module to all of the other modules. Each module selects the digital information intended for it by utilizing address information transmitted over the common bus.

One of the problems encountered in the use of busses for interconnecting communications links is lack of robustness. The term "robustness" in a data bus denotes the ability of the bus to minimize or avoid errors in data during potentially disruption events such as removal, insertion, or failure, of a module on the bus.

Another problem is the lack of resiliency. The modules which provide the links of a typical digital communications system can be referred to as "device modules". These are usually accompanied on the bus by a control module, which performs various operations essential to the proper functioning of the device modules. Failure of a control module can be disastrous. Resiliency of a digital communications system can be improved by providing redundant control modules. However it is difficult to achieve reliable switch-over operation in a system having redundant control modules.

Other problems classifiable under "lack of resiliency" include malfunctions of device modules, and data loss due to timing misalignments during the transmission of message frames.

Still other problems encountered in the interconnection of communications links are the problem of inadequate bandwidth capacity and system complexity.

Among the objects of this invention are the solution to one or more of the above-described problems and the provision of a bus architecture having improved robustness and resiliency, higher bandwidth capacity, greater versatility, and simplicity.

The digital communications apparatus in accordance with the invention utilizes a private data bus for each of its modules. Each data bus is connected to conduct only data transmitted by its own module, and to deliver the data so transmitted to every other one of the modules. The data is delivered to each module through a passive resistance to isolate the bus from a failed receiver. The use of private data busses for each module contributes to robustness of the system because insertion and removal of a device module, failure of a device module, and bus failure are much less likely to be disruptive to the system. The use of private data busses for each module also contributes to the bandwidth capacity of the system.

Another feature of the invention, made possible by the private data bus feature, is the provision of split data busses. More specifically, with the modules in an array with a first module at one end of the array, a last module at the opposite end of the array, and a plurality of intermediate modules situated between the first and last modules, the data bus for each of the intermediate modules is divided into first and second sections. The first section is connected directly to the intermediate module by a first connection to conduct data transmitted by the intermediate module and to deliver the data so transmitted to the first module and to all of the modules between the intermediate module and the first module. The second section is also connected directly to the intermediate module by a second connection independent of the first connection, to conduct data transmitted by the same intermediate module and delivers the data so transmitted to the last module and to all of the modules between the intermediate module and the last module. Preferably, the two sections of each of the split data busses have separate drivers receiving the same data at their inputs. This arrangement avoids having a driver at an intermediate location on a bus. Instead, each bus section has a driver at one end and a bus termination at a distant end. This results in improved signal characteristics on the data busses.

Each of the data busses is connected to a first set of contacts of a corresponding module-receiving slot in order to conduct data transmitted by the module plugged into the slot. The array of slots can accommodate special, high-bandwidth modules if each of the data busses is connected not only to the first set of contacts on its corresponding slot, but also to a special set of contacts on another, preferably adjacent, slot. Special high-bandwidth modules, plugged into every other slot in the array can use two data busses each if the remaining slots are left empty, or, if the remaining slots are occupied, there are no driver connections to their corresponding data busses. Thus, an array of slots, normally having one module in each slot and operating at a given bandwidth, can be operated with half the normal number of modules, but at twice the normal bandwidth.

The digital communications apparatus preferably comprises multiple device modules and at least one control module which provides clock signals to each of the device modules through separate clock lines, each leading from the control module to one device module. This use of separate clock signals improves the robustness of the system and also contributes to improved signal characteristics in the clock pulses.

Data is transmitted between modules synchronously in message frames. Each control module includes a counter, responsive to the clock signal, for counting the clock cycles during each message frame and generating encoded synchronization signals repeatedly during the time for each message frame. The encoded synchronization signals are representative of the time in each frame, and are conducted from the control module to each of the device modules by separate lines. In the device modules, the encoded synchronization signals can be compared with a time slot count maintained in each device module many times during a frame, thus maintaining synchronization and reducing data loss.

Reset signals, which are individually generated for each of the device modules, are appended to the synchronization signals and transmitted by the control modules to the device modules along with the encoded synchronization signals. The reset signal can be used to reset or disable any device module.

The apparatus of the invention preferably utilizes first and second redundant control modules along with a set of device modules. To coordinate switch-over from one control module to another, a majority voting technique is used. The voting system comprises a first line connected to all of the modules and switchable to one or the other of two logic states by the first control module, a second line connected to all of the modules and switchable to one or the other of two logic states by the second control module, and a third line connected to all of the modules, the third line being normally in one of two logic states and switchable to the other logic state by any of the device modules. A switch-over circuit on each of the device modules, and also on each of the control modules, is responsive to the logic states of the three lines, and selects one or the other of the control modules depending on the logic states of the lines. By virtue of the use of three voting lines, switch-over decisions are based on three pieces of information. Thus, the switch-over system is immune to any single failure.

Further details, objects and advantages of the invention will be apparent from the following detailed description when read in conjunction with the drawings.

DETAILED DESCRIPTION

Figure 1:
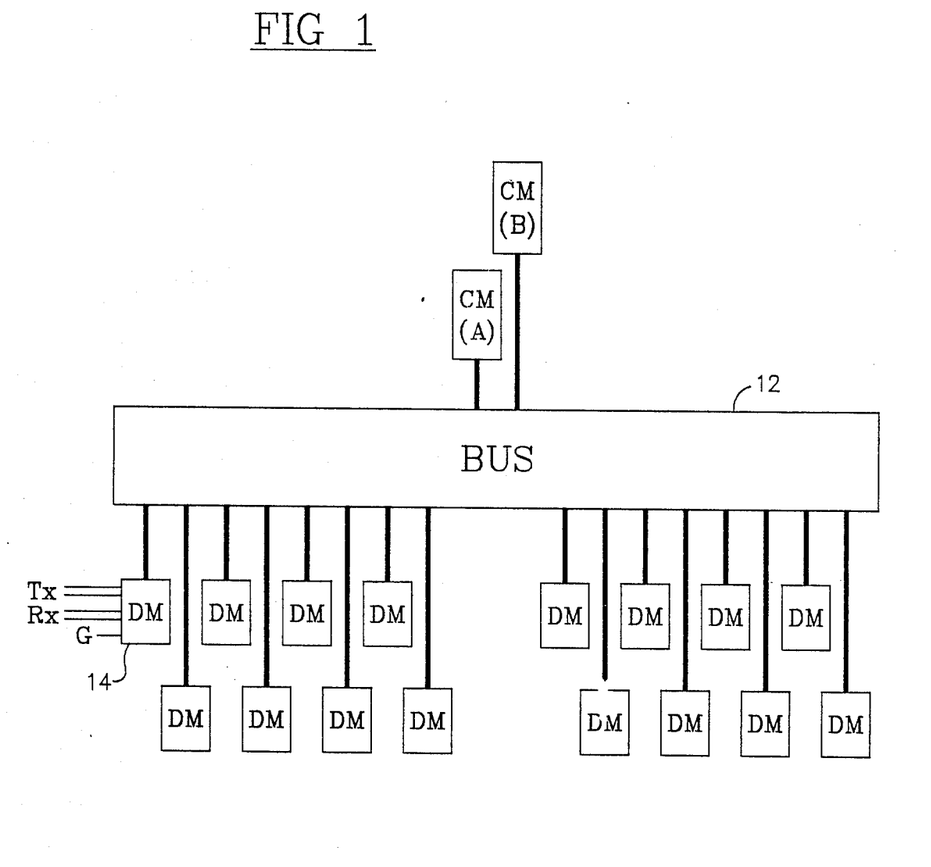
FIG. 1 is a schematic block diagram of a digital communications system in accordance with the invention, showing a plurality of device modules and two control modules interconnected by a system of busses.

FIG. 1 shows a typical digital communications system in accordance with the invention. It comprises a set of sixteen device modules DM, and a set of two control modules CM(A) and CM(B), all interconnected by a system 12 of busses, which includes data busses as well as various clock lines, voting lines, and lines for carrying synchronization and reset signals.

Each device module DM is linked through five conductors to a high speed telecommunications link, for example a "T3" link, i.e. one operating at a speed of approximately 45 megabits per second (Mb/s). Each link carries multiplexed data, voice or image information, or combinations thereof, over an outgoing transmit (Tx) pair and an incoming (Rx) pair. The Tx and Rx wires for DM 14 are shown in FIG. 1. A fifth wire labelled G is a ground.

Each T3 link has 672 channels. The general function of the apparatus is to provide switching to interconnect any one of the channels for any one of the sixteen links to any selected other channel in the system. The manner in which switching is carried out is conventional and need not be described in detail.

The invention relates specifically to certain features of the bus architecture which facilitate robustness, resiliency, bandwidth, versatility and simplicity of the bus system. Two such feature are the use of private data busses for each module, and the use of split data busses. These features are depicted in FIGS. 2 and 3.

Figure 2:
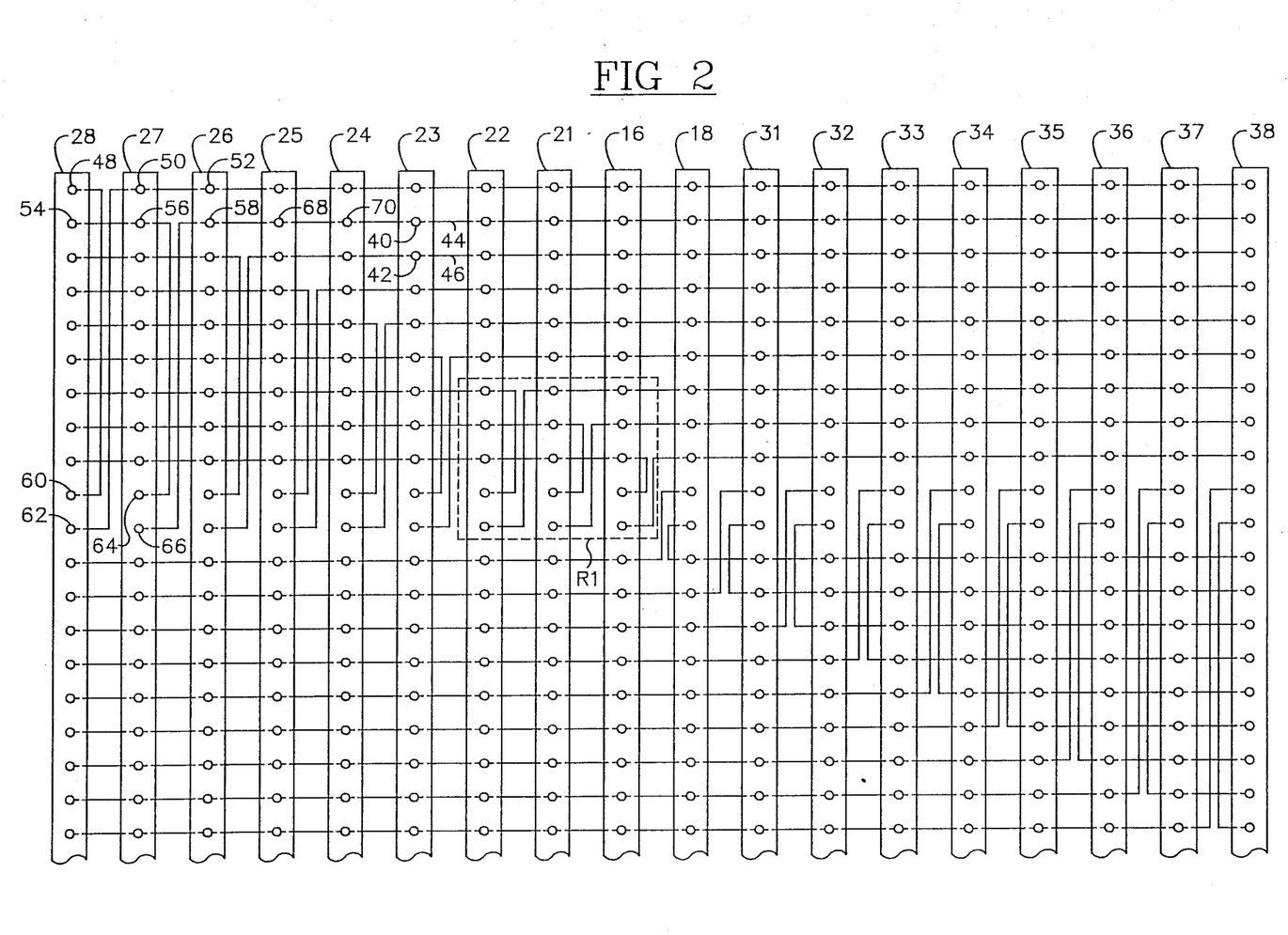
FIG. 2 is a schematic diagram showing an array of slots for device and control modules interconnected by data busses, each bus being represented by a horizontal line.
Figure 3:
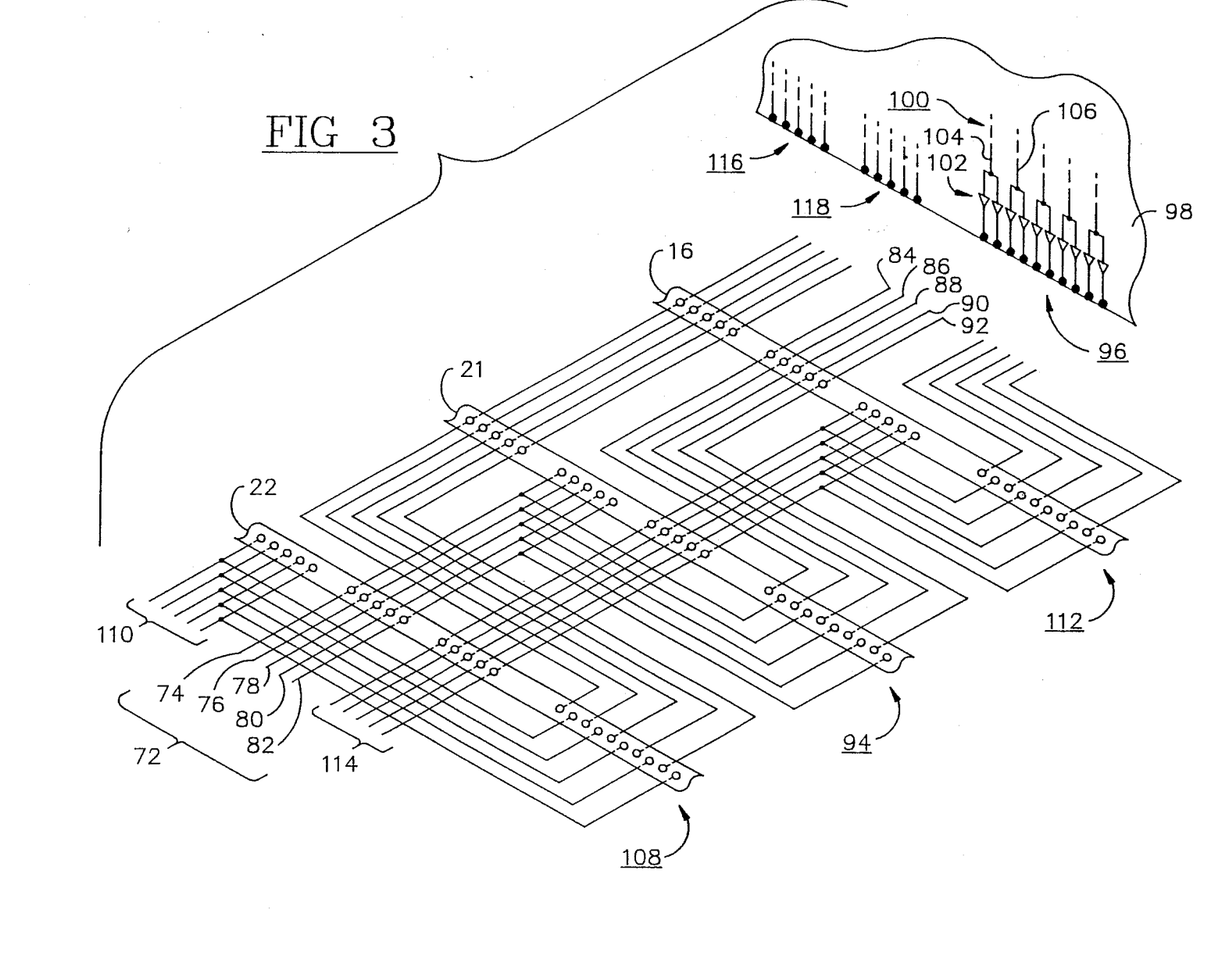
FIG. 3 is a detailed schematic diagram showing a portion of the slot array of FIG. 2, with each data bus shown as five lines, and also showing a portion of a device module to be plugged into one of the slots.

FIG. 2 shows the data bus portions of an array of eighteen slots designed to receive plug-in modules. The central slots 16 and 18 are provided for redundant control modules CM(A) and CM(B) respectively. There are eight slots for device modules (DMs) on either side of the control module, the slots of the left-hand group being designated 21-28 respectively, and the slots of the right-hand group being designated 31-38. Placing the two control module slots in the middle of the array minimizes the path distance over which clock pulses, synchronization signals, reset signals and supervisory signals must travel from the control modules to the device modules. Each of the points on a slot, e.g. points 40 and 42, represents five connections to a plug-in board, and each of the lines in FIG. 2, e.g. lines 44 and 46, represents five conductors on the backplane. Each data bus is five conductors wide, and is connected to all eighteen slots at a particular level in FIG. 2. Thus, a data bus corresponding to slot 28 is connected to the uppermost points on the slots, i.e. points 48, 50, 52, etc. Similarly, the data bus corresponding to slot 27 is connected to the points in the second row, i.e. points 54, 56, 58, etc.

The backplane is wired so that the same set of transmit pins on each plug-in module is connected to the data bus corresponding to that module. The transmit pins for each module are at the same location on the plug-in edge of the module board. Likewise, on the slots, the contacts which receive the transmit pins of the modules are all located at the same level. Points 60 and 62 represent the transmit pin-receiving contacts for slot 28. Similarly, points 64 and 66 represent the transmit pin-receiving contacts for slot 27. The five conductors connected to the contacts represented by point 60 are connected to the five contacts on slot 28 represented by point 48. The five conductors connected to the contacts represented by point 62 are connected to the five contacts represented by point 50 on slot 27, to the five contacts represented by point 52 on slot 26, and to the uppermost five contacts, i.e. the first data bus level, on each of the remaining slots. Point 64 is connected in a similar manner to points 56 and 54 at the second data bus level on slots 27 and 28, and point 66 is connected to points 58, 68, 70, 40, etc. at the second data bus level on the other slots.

As will be apparent from inspection of FIG. 2, each of the eighteen slots has its own data bus, and each data bus is split into two parts, a right-hand part and a left-hand part. The splitting of each data bus into two parts allows the two parts to be driven by separate drivers, as will be seen more clearly in FIG. 3, which shows the details of the part of FIG. 2 within rectangle R1.

In FIG. 3, the left-hand section of five-conductor data bus 72 comprises conductors 74, 76, 78, 80 and 82, which are connected, at the eighth data bus level, to contacts on slots 21 and 22 (FIG. 3) and slots 23-28 (not shown in FIG. 3). The right-hand section of data bus 72 comprises conductors 84, 86, 88, 90 and 92, which are connected, also at the eighth data bus level, to slot 16 (FIG. 3) and to slots 18 and 31-38 (not shown in FIG. 3). Slot 21 has ten transmit contacts 94 connectable to transmit pins 96 on module board 98. Each of five conductors 100 on the module board is connected to two of ten drivers 102, which drive the ten transmit pins 96. Contacts 94 of slot 21 are connected to data bus 72 in such a way that bus conductors 74 and 84 are driven by the data from module conductor 104, bus conductors 76 and 86 are driven by the data from module conductor 106, etc.

Transmit contacts 108 of slot 22 are similarly connected to data bus 110, and transmit contacts 112 of slot 16 are similarly connected to data bus 114. As shown in FIG. 2, each slot has a corresponding data bus connected to its transmit pins.

Returning to FIG. 3, module board 98 has a set of five receive pins for each data bus. Receive pins 116 and 118 shown in FIG. 3 are connectable to busses 72 and 114 respectively. All of the module boards have similar sets of pins.

As will be apparent from FIGS. 2 and 3, the split busses allow each of the data bus drivers to be located at one end of a conductor. A single termination resistor (not shown) is preferably placed at the end of each conductor remote from the driver and connected to ground. The load on each driver comprises the single termination resistor and from one to seventeen data receivers, which are preferably CMOS logic because of its insignificant DC drive current requirements and high noise immunity.

The provision of a private data bus for each module, and high impedance inputs on the receiving modules, makes the system substantially immune from disruption due to insertion or removal of a device module, device module failure, or failure of a data bus. The use of private data busses also provides the bus system with increased data-carrying capacity and the capability of using split busses.

Splitting each data bus into left and right sections allows each data bus conductor to have its driver located at one end and to have a termination at its opposite end. The termination resistors can be chosen to match or approximately match the characteristic impedance of the backplane, thereby eliminating, or at least substantially reducing, reflections, with resulting improvement in the signal characteristics in the data busses.

Figure 4:
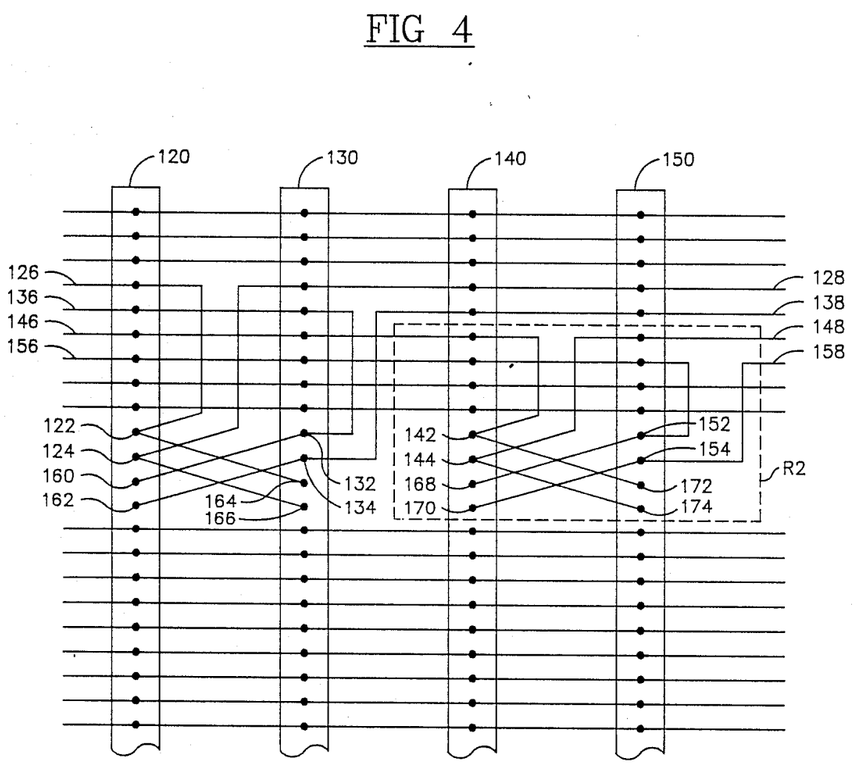
FIG. 4 is a schematic diagram showing a portion of a slot array in an embodiment of the invention in which each data bus (represented by a horizontal line) is connected to a pair of adjacent slots in order to enable the slot array to be used with high bandwidth modules.
Figure 5:
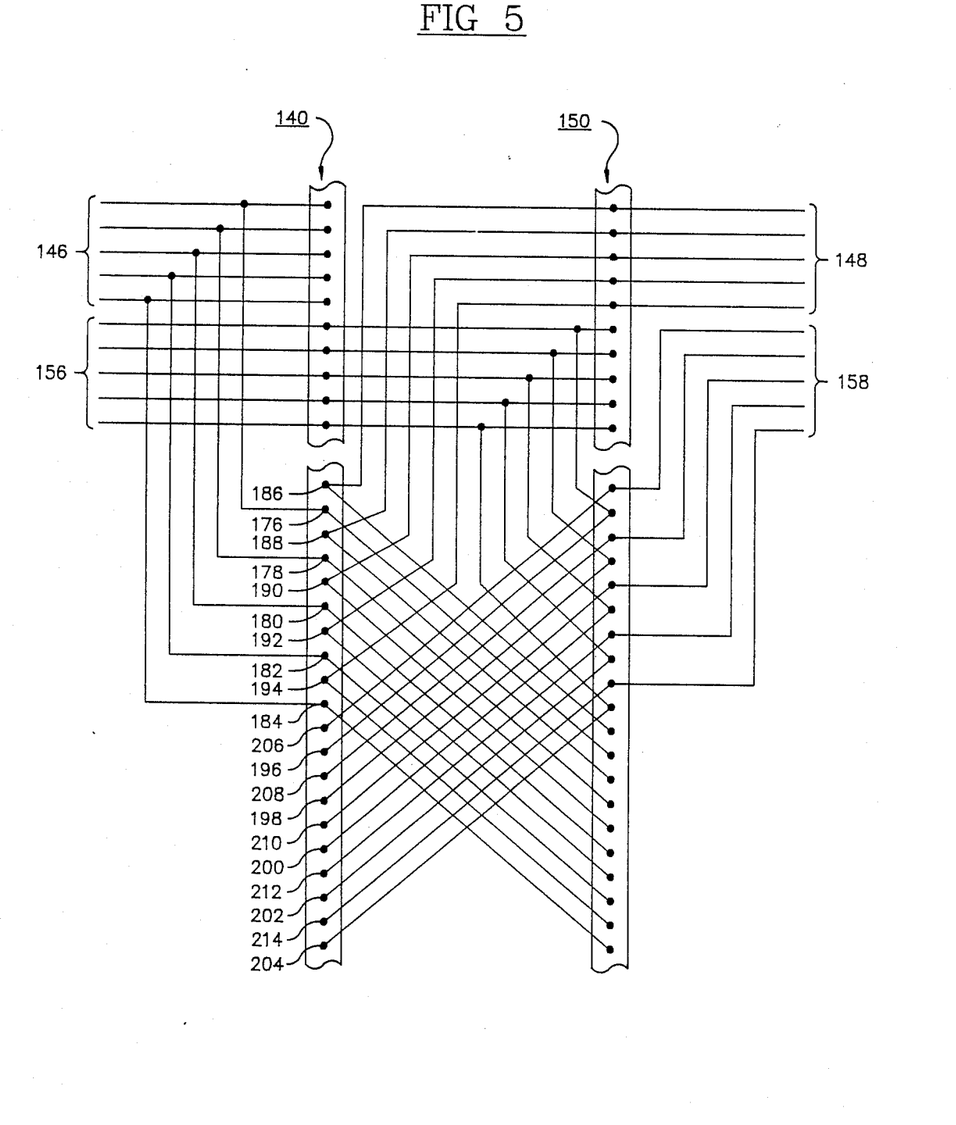
FIG. 5 is a detailed schematic diagram showing a portion of the slot arraY of FIG. 4, each data bus being represented by five lines.

The slots may be utilized, as shown in FIGS. 4 and 5 to allow for operation with special high-bandwidth modules in every other slot. Pairs of five-conductor data busses are used as ten-conductor data busses to accommodate the high-bandwidth modules.

As shown in FIG. 4, slot 120 has transmit contacts 122 and 124 connected respectively to sections 126 and 128 of a five-conductor split data bus. On slot 130, transmit contacts 132 and 134 are connected respectively to sections 136 and 138 of another five-conductor split data bus. On slot 140, transmit contacts 142 and 144 are connected respectively to sections 146 and 148 of another five conductor split data bus. On slot 150, transmit contacts 152 and 154 are connected respectively to sections 156 and 158 of still another five-conductor split data bus.

As described so far, the slots in FIG. 4 are connected to the data busses in exactly the same manner as those in FIG. 2. Each of the slots of FIG. 4, however, has a second set of transmit contacts which are connected on the backplane to the first set of transmit contacts on an adjacent slot. Slot 120, for example, has additional transmit contacts 160, which are connected to transmit contacts 132 on slot 130, and transmit contacts 162, which are connected to transmit contacts 134 on slot 130. Slot 130 has additional transmit contacts 164 and 166, which are connected to transmit contacts 122 and 124 respectively on slot 120.

Slot 140 has additional transmit contacts 168 and 170 connected respectively to transmit contacts 152 and 154 on slot 150. Slot 150 has additional transmit contacts 172 and 174 connected respectively to transmit contacts 142 and 144 on slot 140.

The details of the backplane connections in rectangle R2 of FIG. 4 are shown in FIG. 5. Contacts 122 (FIG. 4) comprise five contact points 176, !78, 180, 182 and 184, and are connected as shown to the left branch 146 of a five-conductor bus. Contacts 186, 188, 190, 192 and 194 are connected to the right hand branch 148 of the same bus. Corresponding transmit contacts on slot 150 are shown connected to the left and right branches 156 and 158 of another five-conductor bus.

Additional contacts 168 (FIG. 4) comprise five contact points 196, 198, 200, 202 and 204 on slot 140. These contacts are connected to the left hand bus branch 156. Contacts 170 comprise contacts 206, 208, 210, 212 and 214 on the same slot, and are connected to right-hand bus branch 158. Additional contact points on slot 150, corresponding to contact points 172 and 174 in FIG. 4, are connected to left and right hand bus branches 146 and 148 respectively, as shown in FIG. 5.

With all of the slots, or at least all of the device module slots divided into pairs connected together as shown in FIGS. 4 and 5, the slots can be used with modules utilizing five-conductor data busses, or alternatively with higher-bandwidth (e.g. double bandwidth) modules utilizing ten-conductor data busses. In the latter case, the higher-bandwidth modules are plugged into every other DM (device module) slot, and the remaining DM slots are either left empty or used to hold auxiliary modules having no driver connections to the data busses corresponding to those slots.

Figure 6:
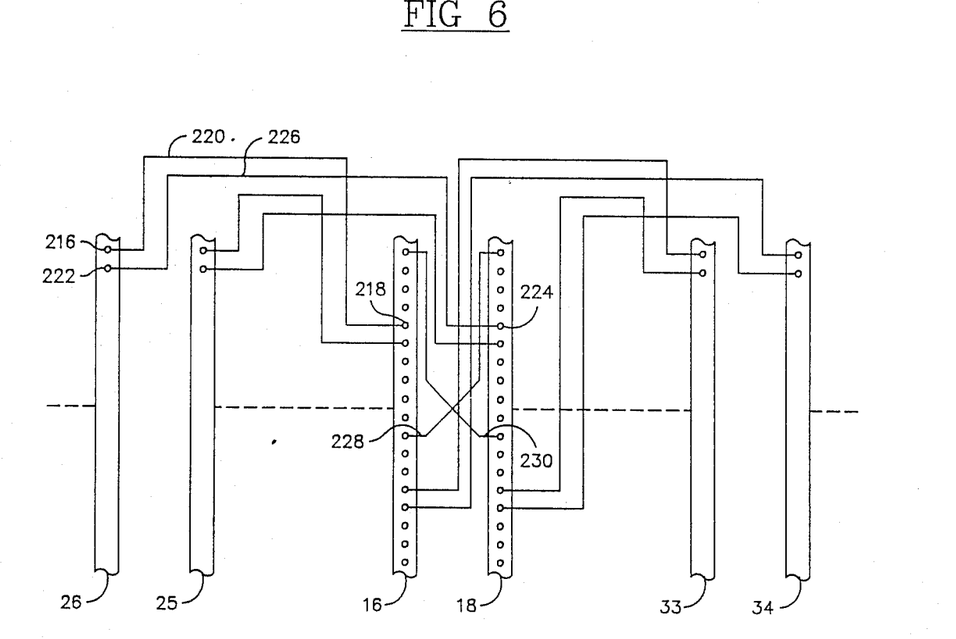
FIG. 6 is a fragmentary schematic diagram showing the manner in which clock signals (and sync/reset signals) are conducted by individual conductors from the control modules to the device modules.

Clock pulses generated in the control modules are used to synchronize the transfer of data and of synchronization and resetting signals. The clock pulses generated in each control module are distributed to all of the device module slots and also to the slot for the other control module in the manner shown in FIG. 6. Two system clock lines are provided for each device module, one from the control module CM(A) in slot 16 and the other from control module CM(B) in slot 18. Clock terminal 216, which is a single contact, is connected to terminal 218 on slot 16 through a single conductor line 220 on the backplane. Clock terminal 222 on slot 26 is connected to terminal 224 through conductor 226. Each of the device module slots is similarly connected to both of the control modules. Lines 228 and 230 conduct a system clock signal from each control module slot to the other control module slot.

Figure 7:
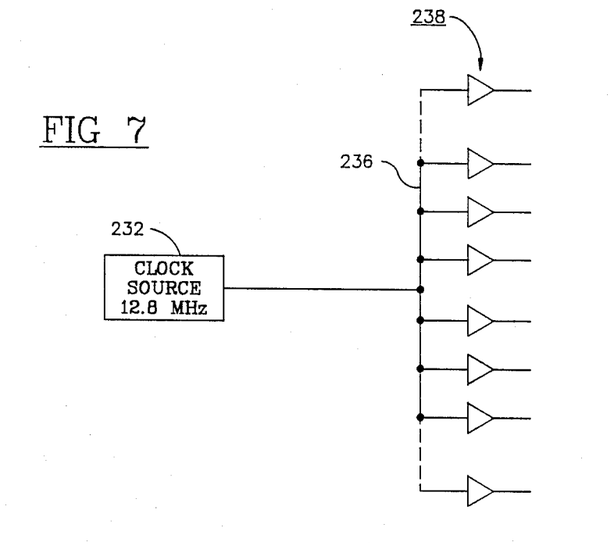
FIG. 7 is a schematic diagram of a clock signal generator as provided on the control modules.

As shown in FIG. 7, clock pulses are generated in each of the control modules by a 12.8 MHz clock source 232. The pulses are delivered through a common conductor 236 to the inputs of drivers 238. The outputs of the drivers are connected to pins on the plug-in control modules which mate with the clock contacts, e.g. contact 218 (FIG. 6) of the control module slots.

In the operation of the system, only one control module is active at a time. Consequently, at any given time, only one set of the two redundant sets of system clock lines is used by the device modules and the off-line control module.

The use of individual clock lines allows for controlled impedance for high speed operation and also contributes to robustness of the system in that a short-circuit in any one clock line will not disable the entire system.

The use of separate system clock lines for each slot serves two purposes. First, it enhances system reliability since clock driver failure, or noise in the clock signals due to insertion or removal of a card, affects no other module. Secondly, since each of the clock lines takes the form of a point-to-point transmission line, with one driver and one receiver, and with a controlled backplane impedance, the clock lines provide a more controlled environment for clock signal distribution.

Since each control module provides separate system clock lines to all other modules, a short-circuited driver on one control module cannot disable the corresponding driver on the other module. All modules have gating at their clock inputs for selecting either clock line as determined by the voting logic.

Synchronization and resetting signals are provided by the control modules to the device modules through sync/reset lines, there being two sync/reset lines for each device module, one from control module CM(A) and the other from control module CM(B). The sync/reset lines are connected between slots in the backplane substantially in the same way the system clock lines are connected in FIG. 6. Both control modules provide synchronization and reset signals, but only the on-line path is selected by the voting logic.

For a full understanding of the operation of the synchronization and resetting signals, it should be understood that, in the preferred embodiment of the invention, the data busses are five-conductor busses carrying simultaneous quintets of data in each clock cycle. Data is organized in the form of 20 bit words, each of which occupies a time slot consisting of four clock cycles. Since the clock rate is 12.8 MHz, a single clock cycle occupies 78.125 nanoseconds. The time slot is therefore 312.5 ns. in duration. A message frame consists of 6400 time slots, and occupies 2 milliseconds. Supervisory data is passed on the data busses along with application data, and all time slots not dedicated to application data are available for supervisory use.

Each device module includes a time slot counter or TSC, which marks each of the 6400 time slots in a frame. The TSCs are used to coordinate bus operation, and are synchronized by synchronization and reset signals from the active control module in order to coordinate module-to-module communication. The synchronization signals are encoded in several consecutive clock cycles and provide synchronization points so that all of the modules combine sequential quintets of data into words on the same boundaries. Module reset signals are also encoded and passed from the active control module to the device modules over the sync/reset lines. A control module can restart a device module by providing a single reset signal or disable a device module by providing a repeated reset signal. The manner in which synchronization and resetting takes place within a device module will be described subsequently with reference to FIG. 10.

Figure 8:
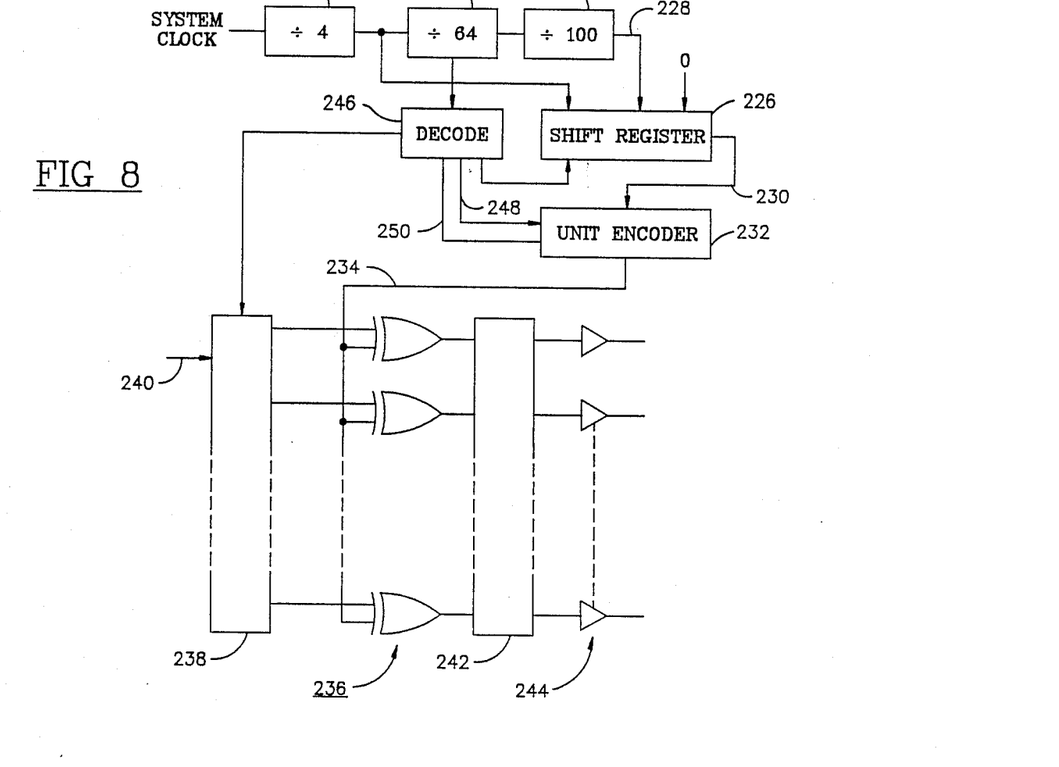
FIG. 8 is a schematic block diagram of a synchronization and reset signal generator as provided on the control modules.

The synchronization and resetting circuit, which resides on each of the control modules, is shown in FIG. 8, and comprises a series of counters 220, 222 and 224. Counter 220 is a divide-by-four counter which counts system clock pulses and provides an output pulse for each time slot, that is for each word consisting of four quintets. The time slots are counted by divide-by-sixty four counter 222, which is followed by a divide-by-one hundred counter 224.

The divide-by-sixty four counter and the divide-by-one hundred counter count to 6400, which is the number of time slots in a frame. The most significant bits in the count, which are derived from the divide-by-one hundred counter, are encoded to provide the synchronization signal, which is transmitted every sixty fourth time slot, i.e. every twenty microseconds. The sync/reset message consists of a stream of bits consisting of nine units of four bits each. The sync/reset message begins with a start unit. The following seven units, corresponding to the count in the divide-by-one hundred counter 224, represent the synchronization data. A ninth unit is a reset unit. When the sync/reset message is not present, an idle pattern, for example, a series of "1"s, is transmitted over the sync/reset lines.

The seven bits representing the count in counter 224 are simultaneously loaded into an eight bit shift register 226 through path 228. A ninth bit in the shift register, corresponding to the reset unit of the sync/reset message, is forced to "0". The bits loaded into the shift register are clocked serially through line 230 to a bit encoder 232, which produces a bit stream consisting of nine units of four bits each in line 234. The bit stream is fed through line 234 to eighteen exclusive OR gates 236. The other inputs of the exclusive OR gates 236 are derived from a register 238, which maintains the reset unit information for each of the modules, derived in the control module through path 240. The outputs of the gates are reclocked in a register 242, and fed through buffers 244 to individual sync/reset lines on the backplane, which lead to each of the modules.

A decoder 246, driven by an output from counter 222, controls loading of the shift register 226, and transfer of reset state information from register 238. It also controls unit encoder 232 through lines 248 and 250, causing the unit encoder to produce a series of idle codes (1111) between sync/reset messages and to produce a start unit (1010) at the beginning of each sync/reset message.

The unit encoder provides a serial bit stream beginning with a four bit start unit (1010) and ending with a four bit reset unit, which can be either 0110 or 0101. The unit encoder generates idle codes (1111) between synchronization messages. The start unit is followed by seven four bit units, representing the synchronization information. A unit consisting of bits (0110) represents a logical zero, and a unit consisting of bits (0101) represents a logical one. These codes offer a high degree of protection against transients and other failures. The coding for the start unit, the logic one unit and the logic zero unit have two ones and two zeros. A single bit error in the start code and logic codes, therefore, cannot result in steady ones or steady zeros. The codes also differ from one another by two bits. Therefore a single bit error will not result in the interpretation of erroneous units as valid codes.

The reset unit information register 238 is only enabled for the last two bits of the ninth (reset) unit. The unit encoder 232 delivers a zero unit to the exclusive OR gates during the ninth unit interval. However, if a reset bit for any module is set in register 238, the corresponding exclusive OR gate complements the last two bits of the reset unit and thus delivers a logical "1" to register 242, and the "1", representing a reset signal, is sent to the module through the appropriate sync/reset line.

Because encoded synchronization signals are sent to the modules every sixty fourth time slot, that is every twenty microseconds, the time during which the control module and device module counters can remain out of synchronization is very short.

Figure 9:
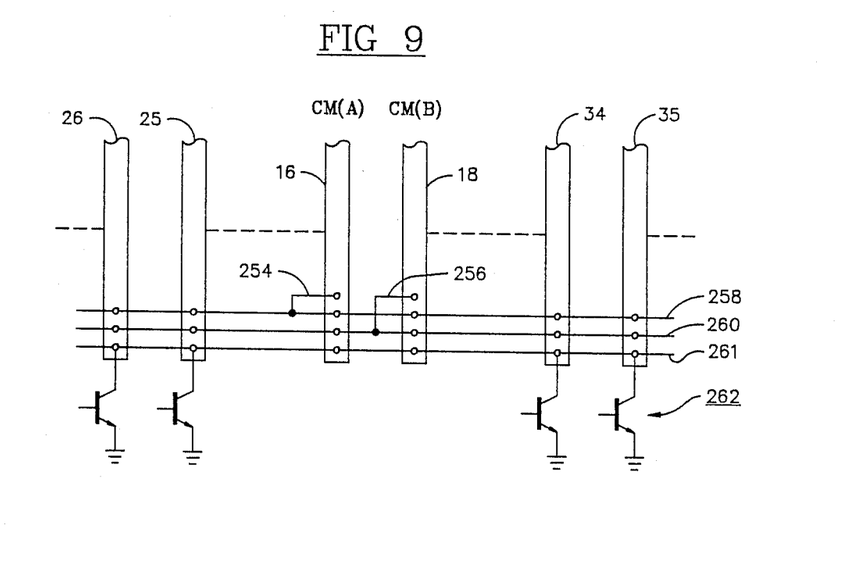
FIG. 9 is a fragmentary schematic diagram showing the voting lines used for controlling switch-over from one of the two redundant control modules to the other.

FIG. 9 shows the voting lines which coordinate the switch-over from one control module to the other. The control module CM(A) in slot 16 uses contact 254 to drive voting line 258. The control module CM(B) uses contact 256 to drive voting line 260. A third voting line 261 can be switched to ground (logic zero) by any of sixteen transistors 262, there being one transistor in each of the device modules. Signals in each of the three voting lines are received by all of the modules, including the control modules as well as the device modules. Each of the modules includes logic to interpret the states of the three lines as votes indicating which of the two control modules should be on line. Thus, a coordinated switch-over is achieved when necessary. The use of majority voting, based on three pieces of information, contributes to fault tolerance because it immunizes the system from a single failure.

The output of the majority decode logic on all modules, indicating the on-line control module, is identical. All modules select the system clock line, sync/reset line and supervisory path from the on line control module.

Line 258 carries the vote cast by control module CM(A), and its state depends on self diagnosis by CM(A) and diagnosis of CM(B). Line 260 carries the vote cast by control module CM(B) and its state depends on self-diagnosis by CM(B) and diagnosis of CM(A). Line 261 carries the tie-breaking vote in case of a disagreement between lines 258 and 260. Each device module votes for CM(A) or CM(B) on the basis of integrity of the supervisory path, clock line and sync/reset line from each control module.

In the following truth table, a "1" logic 258 represents a vote for CM(A) on that line while a "0" logic level on line 258 represents a vote for CM(B). On line 260, the opposite situation prevails. A "1" logic level on line 260 represents a vote for CM(B), while a "0" logic level represents a vote for CM(A). On the device module-controlled voting line 261, a "1" logic level represents a vote for CM(A), while a "0" logic level represents a vote for CM(B). A missing control module produces a "0" logic level on its corresponding voting line due to backplane termination. Since the device modules are ORed together at line 261, a missing device module has no effect on the vote cast by the remaining device modules.

| LINE 258 | LINE 260 | LINE 261 | SELECTED CONTROL MODULE |
|---|---|---|---|
| 1(A) | 0(A) | 1(A) | CM(A) |
| 1(A) | 0(A) | 0(B) | CM(A) |
| 1(A) | 1(B) | 1(A) | CM(A) |
| 1(A) | 1(B) | 0(B) | CM(B) |
| 0(B) | 0(A) | 1(A) | CM(A) |
| 0(B) | 0(A) | 0(B) | CM(B) |
| 0(B) | 1(B) | 1(A) | CM(B) |
| 0(B) | 1(B) | 0(B) | CM(B) |

The majority decode logic on each module, which may take the form of discrete or programmable logic, or may be firmware-implemented, reads the three voting lines, determines the majority vote according to the above table, and effects a switch-over from one control module to the other simultaneously on all of the modules. The voting lines are clocked for a synchronous switch-over. Clock failure detection circuitry on each module unconditionally selects the operational control module in the event of failure in a system clock line.

A clear signal appearing when the system is powered up causes both control modules to vote for each other, and the device modules to vote for CM(A), so that CM(A) is temporarily selected.

If control module CM(A) is missing, line 258 casts a vote for CM(B). Control module CM(B) carries out a "sanity check" of CM(A), which is negative since CM(A) is not present. There are therefore two votes for CM(B), and the votes by the device modules in line 261 do not matter. CM(B) is placed on line.

If control module CM(B) is missing, line 260 casts a vote for CM(A), and CM(A) votes for itself. Again the device module votes do not matter, and CM(A) is placed on line.

If the on-line control module operates erratically, sanity checks of the on-line control module by the off-line module cause the off-line module to vote for itself. The device modules also vote for the off-line control module because of erratic supervisory operation. Two votes against the on-line control module, therefore cause switch-over to take place.

If the off-line control module is erratic, the on-line control module, although it detects erratic operation of the off-line module by sanity checks, continues to vote for itself. The device modules are satisfied with the on-line control module, and consequently also vote for the on-line control module. Therefore, the on-line module remains on line.

Figure 10:
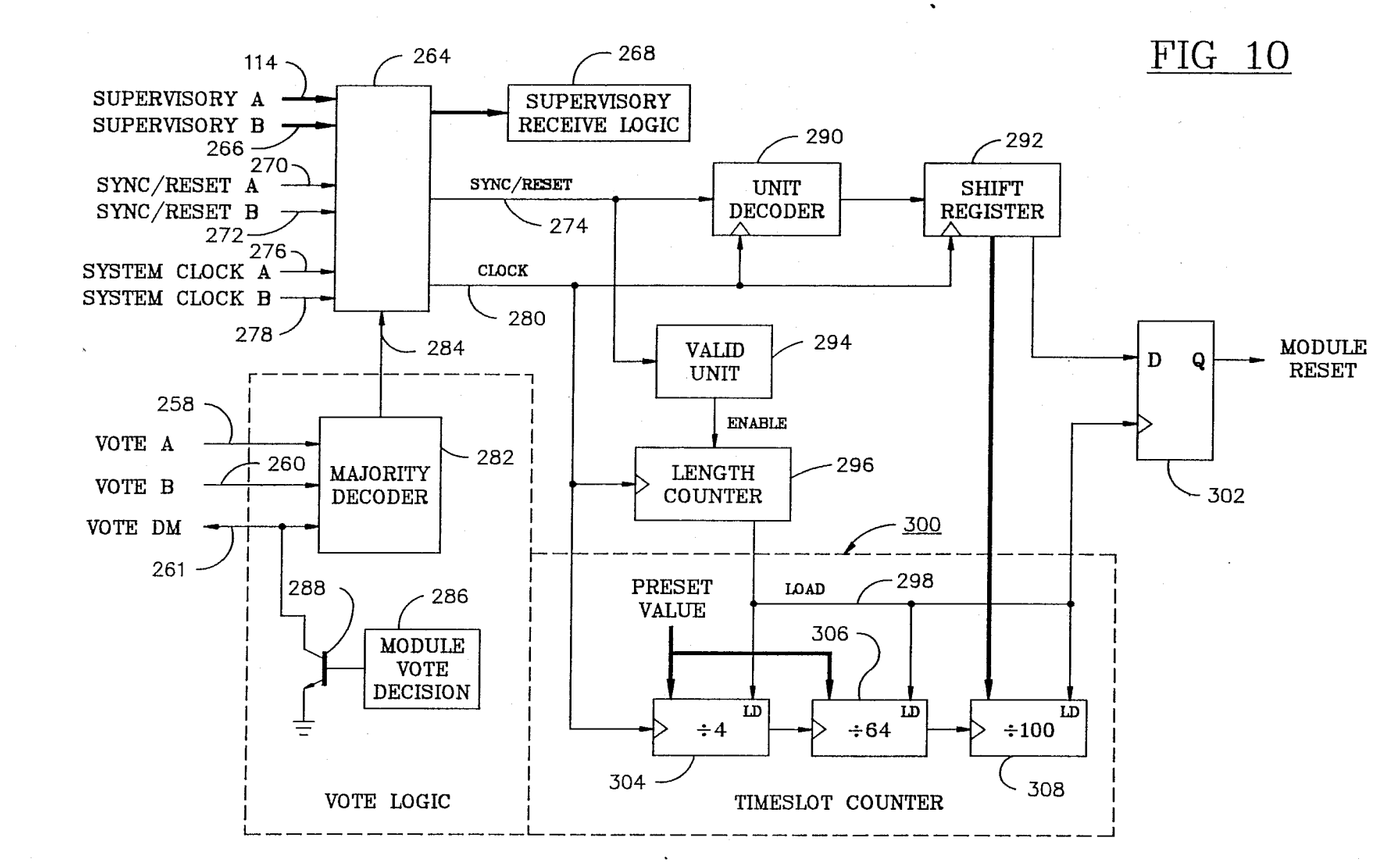
FIG. 10 is a schematic block diagram illustrating the portions of a device module which effect switch-over and synchronization.

Referring now to FIG. 10, which shows the portions of a device module which handle switch-over and synchronization, a multiplexer 264 is used as a switch for selecting supervisory signals, sync/reset signals, and clock signals from control module CM(A) or CM(B). Supervisory signals are derived from the five-conductor data busses 114 and 266 of the control modules, and one or the other of the control module data busses is switched to the supervisory receive logic 268 of the data module.

Multiplexer 26 similarly receives sync/reset signals from the control modules CM(A) and CM(B) respectively through lines 270 and 272. Line 270 is connected through the backplane to the output of one of the drivers 244 in FIG. 8. Line 272 is similarly connected to the output of a corresponding driver in the other control module. One or the other of the sync/reset signals is switched to the sync/reset line 274.

Multiplexer 264 also receives clock signals from the control modules through clock lines 276 and 278. Clock line 276 is connected through the backplane to the output of one of the drivers 238 in FIG. 7, and clock line 278 is similarly connected to a clock signal driver in the other control module. One or the other of the clock lines 276 and 278 is switched to clock line 280.

Switching in multiplexer 264 takes place according to the majority vote, as determined by the conditions of voting lines 258, 260 and 261 (see also FIG. 9). A majority decoder 282, operating in accordance with the logic table given above, delivers a selection signal through line 284 to multiplexer 264. This selection signal determines which of the two control modules is on line, and switch over in all of the device modules takes place simultaneously in accordance with the vote in the voting lines. Although the selection of sync/reset signals and clock signals is strictly under the control of the voting lines, provision is made on the device modules for overriding the supervisory path selection to allow communication with an off-line control module.

The control module switch-over can be effected by a console command causing the control modules to agree with each other via the supervisory path. The control modules outvote the device modules and switch-over occurs.

The state of voting line 261 is determined by module vote decisions made in the device modules, the logic for the device module corresponding to FIG. 10 being shown at 286. The module vote decision logic controls transistor 288, which is one of the set of transistors 262, shown in FIG. 9. Line 261 is normally in a logical high condition and is pulled low when the emitter-collector circuit of any one of transistors 262 switches to its conducting state. The module voting decision is typically achieved by the operation of an algorithm in firmware on the device module.

The clock signal in clock line 280 is used by various components of the synchronization circuitry as well as by other components (not shown) of the device module.

The sync/reset line 274 in the device module carries a serial stream of bits generated by the synchronization and reset signal generator of the on-line control module, as shown in FIG. 8. A series of idle codes (1111) is interrupted periodically, e.g. every twenty milliseconds, by a sync/reset message beginning with a start unit (1010) followed by seven units of synchronization information consisting of "zeros" and "ones" represented by four-bit units (0110) and (0101) respectively, and a ninth unit, which can be a "zero" (0110) or a "one" (1010). The start units and seven synchronization units are the same for all of the modules receiving them. The ninth unit, i.e. the reset unit, however, can vary from module to module.

The signals in line 274 are clocked into a decoder 290, which converts the four bit unit codes which follow the start code into "1"s and "0"s. These "1"s and "0"s are clocked into an eight bit shift register 292.

In the meanwhile, the units of the sync/reset message are checked by a validation circuit 294, which recognizes only start units (1010), logical "1"s (0101) and logical "0"s (0110). The validation circuit delivers an enabling signal to a message length counter 296, which receives clock pulses from line 280. If the idle codes are followed by a valid start unit, i.e. (1010), and the seven sync units and the reset unit consist of "1" units (0101) and "0" units (0110), the message length counter delivers a load signal through line 298 to the device module's time slot counter 300, and also to a flip-flop 302, which holds the device module's reset state.

The time slot counter 300 counts the clock pulses from line 280, and comprises a divide-by-four counter 304, a divide-by-sixty four counter 306, and a divide-by-one hundred counter 308 cascaded together. In the device module, the time slot counter identifies time slots within a message frame, and maintains synchronization of the busses by insuring that all of the device modules are on the same time slot at any given time.

At the end of a sync/reset message, if the message units are all validated by validation circuit 294, a "load" signal is given to counters 304, 306 and 308. The seven sync bits in shift register are loaded into the divide-by-one hundred counter 308, and counter 308 is set to agree with the sync bits derived from the shift register regardless of the count existing in counter 308 prior to the delivery of the "load" signal At the same time, upon occurrence of the "load" signal, counters 304 and 306 are set to preset values.

The "load" signal in line 298 also causes the eighth bit in shift register 292 (the reset bit) to enter flip-flop 302, which is either set or allowed to remain in the same condition, depending on whether the reset bit is "1" or "0".

Each of the device modules has a synchronization and voting circuit as shown in FIG. 10, and the control modules have similar synchronization and voting circuits (not shown).

Normally, the count in the time slot counter 300 will be in agreement with the synchronization message at the time the "load" pulse is given at the end of a sync/reset message. However, if the time slot counter is out of synchronization, it is forced to the correct count. This occurs at the end of the sync/reset message, every twenty microseconds. Thus, the device modules cannot remain out of synchronization for more than a very short time.

While the apparatus of the invention has been described with reference to a specific embodiment utilizing particular data speeds, numbers of modules and bus conductors and a particular arrangement of components, it should be understood that the advantages of the invention can be realized in modified embodiments. For example, the number of conductors in a data bus can be other than five; more or fewer than eighteen module-receiving slots can be provided; and provisions can be made to combine more than two data buses to form a higher capacity data bus. Also, the synchronization system can use various encoding schemes and can provide more frequent or less frequent synchronization signals. Modifications can also be made in the voting logic and in many other aspects of the system without departing from the scope of the invention as defined in the following claims.

We claim:

1. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, in which said modules are arranged in an array with a first module at one end of the array, a last module at an opposite end of the array, and a plurality of intermediate modules situated between the first and last modules, and in which the data bus for each of the intermediate modules comprises a first section connected directly to the intermediate module by a first connection to conduct data transmitted by the intermediate module and to deliver the data so transmitted to the first module and to all of the modules between the intermediate module and the first module, and a second section connected directly to the intermediate module, by a second connection independent of the first connection, to conduct data transmitted by the same intermediate module and to deliver the data so transmitted to the last module and to all of the modules between the intermediate module and the last module.

2. A digital communications apparatus according to claim 1 in which each of said intermediate modules has first driver means for driving the first section of its data bus and separate driver means for driving the second section of its data bus, both of the driver means on each of said intermediate modules having inputs connected to receive the same data.

3. A digital communications apparatus comprising at least three modules and interconnecting means comprising a plurality of groups of conductors for providing communication paths between the modules, wherein the interconnecting means comprises a separate data bus for each of said modules, the data bus for each module being connected to conduct only data transmitted by its own module and to deliver the data so transmitted to every other one of said modules, and having a plurality of slots for removably receiving modules, each slot having a plurality of contacts for connection to contacts of a module received thereby, means associated with each slot for connecting a group of its contacts to a first group of conductors associated with the slot, whereby the first group of conductors can be used as one of the separate data busses, and additional means associated with at least one of the slots for optionally connecting another group of its contacts with a second group of conductors constituting the first group of conductors associated with another of said slots, whereby said first group of conductors associated with the slot and said second group of conductors can be used together as a private, higher-bandwidth data bus for a module in said one of the slots.

4. A digital communications apparatus comprising at least three modules and interconnecting means comprising a plurality of groups of conductors for providing communication paths between the modules, wherein the interconnecting means comprises a separate data bus for each of said modules, the data bus for each module being connected to conduct only data transmitted by its own module and to deliver the data so transmitted to every other one of said modules, and having a plurality of slots, in an array consisting of multiple pairs of slots, for removably receiving modules, each slot having a plurality of contacts for connection to contacts of a module received thereby, means associated with each slot for connecting a group of its contacts to a first group of conductors associated with the slot, whereby the first group of conductors can be used as one of the separate data busses, and additional means associated with at least one of the slots of each pair for optionally connecting another group of its contacts with a second group of conductors constituting the first group of conductors associated with the other slot of the pair, whereby, with modules in both slots of a pair, said first group of conductors associated with the slot and said second group of conductors can be used as separate private data busses for the two modules, and alternatively said first group of conductors associated with the slot and said second group of conductors can be used as a private, higher-bandwidth data bus for a single module in said one of the slots.

5. A digital communications apparatus comprising at least three modules and interconnecting means comprising a plurality of groups of conductors for providing communication paths between the modules, wherein the interconnecting means comprises a separate data bus for each of said modules, the data bus for each module being connected to conduct only data transmitted by its own module and to deliver the data so transmitted to every other one of said modules, and having a plurality of slots, in an array consisting of multiple pairs of slots, for removably receiving modules, each slot having a plurality of contacts for connection to contacts of a module received thereby, means associated with each slot for connecting a group of its contacts to a first group of conductors associated with the slot, whereby the first group of conductors can be used as one of the separate data busses, and additional means associated with each of the slots of each pair for optionally connecting another group of its contacts with a second group of conductors constituting the first group of conductors associated with the other slot of the pair, whereby, with modules in both slots of a pair, said first group of conductors associated with the slot and said second group of conductors can be used as separate private data busses for the two modules, and alternatively, said first group of conductors associated with the slot and said second group of conductors can be used as a private, higher-bandwidth data bus for a single module in one of the slots of each pair.

6. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, and having at least one control module and multiple device modules, the control module having means for generating a clock signal, and the apparatus having a plurality of separate lines, each leading from the control module to one of the device modules for conducting the clock signal to the device modules.

7. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, and having a pair of control modules and multiple device modules, each of the control modules having means for generating a clock signal, and each control module having a plurality of separate lines, each line leading from the control module to one of the device modules, for conducting the clock signals from each control module to each of the device modules.

8. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, in which data is transmitted between modules synchronously in message frames, the apparatus having at least one control module and multiple device modules, the control module including means for generating a clock signal, the apparatus including means for conducting the clock signal to all of the device modules, and the control module comprising means, responsive to the clock signal, for counting the clock cycles during each message frame and generating encoded synchronization signals, representing the count of the clock cycles in each frame, repeatedly during each message frame, and means for conducting the encoded synchronization signals to the device modules, in which said means for conducting the encoded synchronization signals to the device modules comprises a plurality of separate lines, there being one of the said lines connected from the control module to each device module.

9. A digital communications apparatus according to claim 8 in which the means for generating encoded synchronization signals includes means for transmitting reset signals to the device modules along with the synchronization signals.

10. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, in which data is transmitted between modules synchronously in message frames, the apparatus having at least one control module and multiple device modules, the control module including means for generating a clock signal, the apparatus including means for conducting the clock signal to all of the device modules, and the control module comprising means, responsive to the clock signal, for counting the clock cycles during each message frame and generating encoded synchronization signals, representing the count of the clock cycles in each frame, repeatedly during each message frame, and means for conducting the encoded synchronization signals to the device modules, in which the means for generating encoded synchronization signals includes means for transmitting reset signals to the device modules along with the synchronization signals, the synchronization signals being the same for all of the device modules, and the reset signals being independent of one another.

11. A digital communications apparatus according to claim 8 in which the means for generating encoded synchronization signals generates said signals as serial data and includes means for transmitting reset signals to the device modules as data appended to the serial data.

12. A digital communications apparatus according to claim 8 in which the means for generating encoded synchronization signals includes means for transmitting reset signals to the device modules along with the synchronization signals, the synchronization signals being the same for all of the device modules, and the reset signals being independent of one another.

13. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, in which data is transmitted between modules synchronously in message frames, the apparatus having at least one control module and multiple device modules, the control module including means for generating a clock signal, the apparatus including means for conducting the clock signal to all of the device modules, and the control module comprising means, responsive to the clock signal, for counting the clock cycles during each message frame and generating encoded synchronization signals, representing the count of the clock cycles in each frame, repeatedly during each message frame, and means for conducting the encoded synchronization signals to the device modules, in which said means for conducting the clock signal to all of the device modules comprises a plurality of separate clock lines, there being one of said clock lines from the control module to each device module, and in which the means for conducting the encoded synchronization signals to the device modules comprises a plurality of separate synchronization lines, there being one of said synchronization lines from the control module to each device module.

14. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, and having first and second redundant control modules, multiple device modules, and means for determining which of the control modules is active and for instructing each device module to respond to the active control module comprising a first line connected to all of the modules and switchable to one or the other of two logic states by the first control module, a second line connected to all of the modules and switchable to one or the other of two logic states by the second control module, and a third lien connected to all of the modules, the third line being normally in one of two logic states and switchable to the other logic state by any of the device modules, and means on each of the device modules, responsive to the logic states of the three lines, for selecting one or the other of the control modules depending on the logic states of said lines.

15. A digital communications apparatus comprising at least three modules and interconnecting means for providing communication paths between the modules, wherein the interconnecting means comprises a separate data bus for each of said modules, the data bus for each module being connected to conduct only data transmitted by its own module and to deliver the data so transmitted to every other one of said modules, and having first and second redundant control modules, multiple device modules, and means for determining which of the control modules is active and for instructing each device module to respond to the active control module comprising a first line connected to all of the modules and switchable to one or the other of two logic states by the first control module, a second line connected to all of the modules and switchable to one or the other of two logic states by the second control module, and a third lien connected to all of the modules, the third line being normally in one of two logic states and switchable to the other logic state by any of the device modules, and means on each of the control and device modules, responsive to the logic states of the three lines, for selecting one or the other of the control modules depending on the logic states of said lines.

16. A digital communications apparatus according to claim 14 in which the state of each line represents a vote for the first or the second control module and in which the means responsive to the logic states of the three lines selects the first or second control module in response to the majority of the votes on the three lines.

17. A digital communications apparatus according to claim 16 including means causing the state of the first line to cast a vote for the second control module when the first control module is missing and means causing the state of the second line to case a vote for the first control module when the second control module is missing.

18. A digital communications apparatus comprising at least three modules and interconnecting means for providing communication paths between the modules, in which data is transmitted between modules synchronously in message frames, the apparatus having at least one control module and multiple device modules, the control module including means for generating a clock signal, and the apparatus including means for conducting the clock signal to all of the device modules, in which the control module comprises means, responsive to the clock signal, for counting the clock cycles during each message frame and generating encoded synchronization signals, representing the count of the clock cycles in each frame, repeatedly during each message frame, and means for conducting the encoded synchronization signals to the device modules, and in which said means for conducting the encoded synchronization signals to the device modules comprises a plurality of separate lines, there being one of said lines connected from the control module to each device module.

19. A digital communications apparatus according to claim 18 in which the means for generating encoded synchronization signals includes means for transmitting reset signals to the device modules along with the synchronization signals.

20. A digital communications apparatus according to claim 18 in which the means for generating encoded synchronization signals includes means for transmitting reset signals to the device modules along with the synchronization signals, the synchronization signals being the same for all of the device modules, and the reset signals being independent of one another.

21. A digital communications apparatus according to claim 18 in which the means for generating encoded synchronization signals generates said signals as serial data and includes means for transmitting reset signals to the device modules as data appended to said serial data.

22. A digital communications apparatus according to claim 18 in which the means for generating encoded synchronization signals includes means for transmitting reset signals to the device modules along with the synchronization signals.

23. A digital communications apparatus according to claim 22, in which the synchronization signals are the same for all of the device modules, and the reset signals are independent of one another.

24. A digital communications apparatus according to claim 18 in which the means for generating encoded synchronization signals generates said signals as serial data and includes means for transmitting reset signals to the device modules as data appended to the serial data.

25. A digital communications apparatus comprising at least three modules and interconnecting means for providing communication paths between the modules, in which data is transmitted between modules synchronously in message frames, the apparatus having at least one control module and multiple device modules, the control module including means for generating a clock signal, and the apparatus including means for conducting the clock signal to all of the device modules, in which the control module comprises means, responsive to the clock signal, for counting the clock cycles during each message frame and generating encoded synchronization signals, representing the count of the clock cycles in each frame, repeatedly during each message frame, and means for conducting the encoded synchronization signals to the device modules, and in which said means for conducting the clock signal to all of the device modules comprises a plurality of separate clock lines, there being one of said clock lines from the control module to each device module, and in which the means for conducting the encoded synchronization signals to the device modules comprises a plurality of separate synchronization lines, there being one of said synchronization lines from the control module to each device module.

26. A digital communications apparatus comprising at least three modules and interconnecting means for providing communication paths between the modules, in which data is transmitted between modules synchronously in message frames, the apparatus having at least one control module and multiple device modules, the control module including means for generating a clock signal, and the apparatus including means for conducting the clock signal to all of the device modules, in which the control module comprises means, responsive to the clock signal, for counting the clock cycles during each message frame and generating encoded synchronization signals, representing the count of the clock cycles in each frame, repeatedly during each message frame, and means for conducting the encoded synchronization signals to the device modules, and in which each of the device modules includes counting means for counting pulses of the clock signal received thereby, and means responsive to the encoded synchronization signals received thereby for revising the count in the device module counting means upon receipt of each encoded synchronization signal when the count represented by the encoded synchronization signal disagrees with the count in the device module counting means.

27. A digital communications apparatus comprising at least three modules and interconnecting means for providing communication paths between the modules, in which data is transmitted between modules synchronously in message frames, the apparatus having at least one control module and multiple device modules, the control module including means for generating a clock signal, and the apparatus including means for conducting the clock signal to all of the device modules, in which the control module comprises means, responsive to the clock signal, for counting the clock cycles during each message frame and generating encoded synchronization signals, representing the count of the clock cycles in each frame, repeatedly during each message frame, and means for conducting the encoded synchronization signals to the device modules, and in which the means for generating encoded synchronization signals includes means for transmitting reset signals to the device modules along with the synchronization signals, and in which each of the device modules includes means responsive to the reset signals for resetting the device module.

28. In a digital communications apparatus comprising at least three device modules, interconnecting means for providing communication paths between the device modules, and first and second redundant control modules, the improvement comprising means for determining which of the control modules is active and for instructing each device module to respond to the active control module comprising a first line connected to all of the modules and switchable to one or the other of two logic states by the first control module, a second line connected to all of the modules and switchable to one or the other of two logic states by the second control module, and a third line connected to all of the modules, the third line being normally in one of two logic states and switchable to the other logic state by any of the device modules, and means on each of the device modules, responsive to the logic states of the three lines, for selecting one or the other of the control modules depending on the logic states of said lines.

29. A digital communications apparatus according to claim 28 including means on each of the control modules, also responsive to the logic states of the three lines for selecting one or the other of the control modules depending on the logic states of said lines.

30. A digital communications apparatus according to claim 28 in which the state of each line represents a vote for or against the first control module and in which the means responsive to the logic states of the three lines selects the first or second control module in response to the majority of the votes in the three lines.

31. A digital communications apparatus according to claim 28 including means causing the state of the first line to cast a vote for the second control module when the first control module is missing and means causing the state of the second line to cast a vote for the first control module when the second control module is missing.

* * * * *